United States Patent
Karpinski et al.

(10) Patent No.: US 12,418,592 B2
(45) Date of Patent: Sep. 16, 2025

(54) METHODS AND SYSTEMS FOR COMMUNICATION PROFILE MANAGEMENT

(71) Applicant: IDEMIA FRANCE, Courbevoie (FR)

(72) Inventors: Pawel Karpinski, Courbevoie (FR); Jacek Macuda, Courbevoie (FR); Tomasz Wozniak, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 825 days.

(21) Appl. No.: 17/331,664

(22) Filed: May 27, 2021

(65) Prior Publication Data

US 2021/0373948 A1  Dec. 2, 2021

(30) Foreign Application Priority Data

May 28, 2020  (FR) ..................................... 20 05657

(51) Int. Cl.
*H04L 67/303* (2022.01)
*H04L 9/40* (2022.01)

(52) U.S. Cl.
CPC ........ *H04L 67/303* (2013.01); *H04L 63/0428* (2013.01); *H04L 63/0823* (2013.01); *H04L 63/0869* (2013.01); *H04L 63/18* (2013.01)

(58) Field of Classification Search
None
See application file for complete search history.

(56) References Cited

U.S. PATENT DOCUMENTS

| | | | |
|---|---|---|---|
| 10,820,189 B2 | 10/2020 | Dumoulin et al. | |
| 2016/0165433 A1* | 6/2016 | Larignon | H04W 8/205 |
| | | | 455/419 |
| 2017/0153913 A1* | 6/2017 | Kaneko | G06F 9/485 |

FOREIGN PATENT DOCUMENTS

| | | |
|---|---|---|
| FR | 3059194 A1 | 5/2018 |
| JP | 2017-517987 A | 6/2017 |
| JP | 2018-506761 A | 3/2018 |

OTHER PUBLICATIONS

GSM Association SGP.22—RSP Technical Specification Version 2.2.1 Dec. 18, 2018.

* cited by examiner

*Primary Examiner* — William G Trost, IV
*Assistant Examiner* — Christopher P Cadorna
(74) *Attorney, Agent, or Firm* — WOMBLE BOND DICKINSON (US) LLP

(57) ABSTRACT

A profile management device is provided. The device comprises a profile management module capable of dynamically creating and executing an execution task to respond to a need for remote management of a communication profile in a secure element embedded in a terminal; a communication module capable of setting up a first communications channel between the execution task and a communication profile manager; the execution task being capable of obtaining the communication profile from the manager via the first communications channel; the communication module being capable of setting up a communications session between the execution task and a communication agent configured to send to the secure element, at least one management command of the profile encapsulated in at least one message sent by the execution task in terms of the session; and a module configured to delete the execution task when an action responding to the need has been performed.

10 Claims, 3 Drawing Sheets

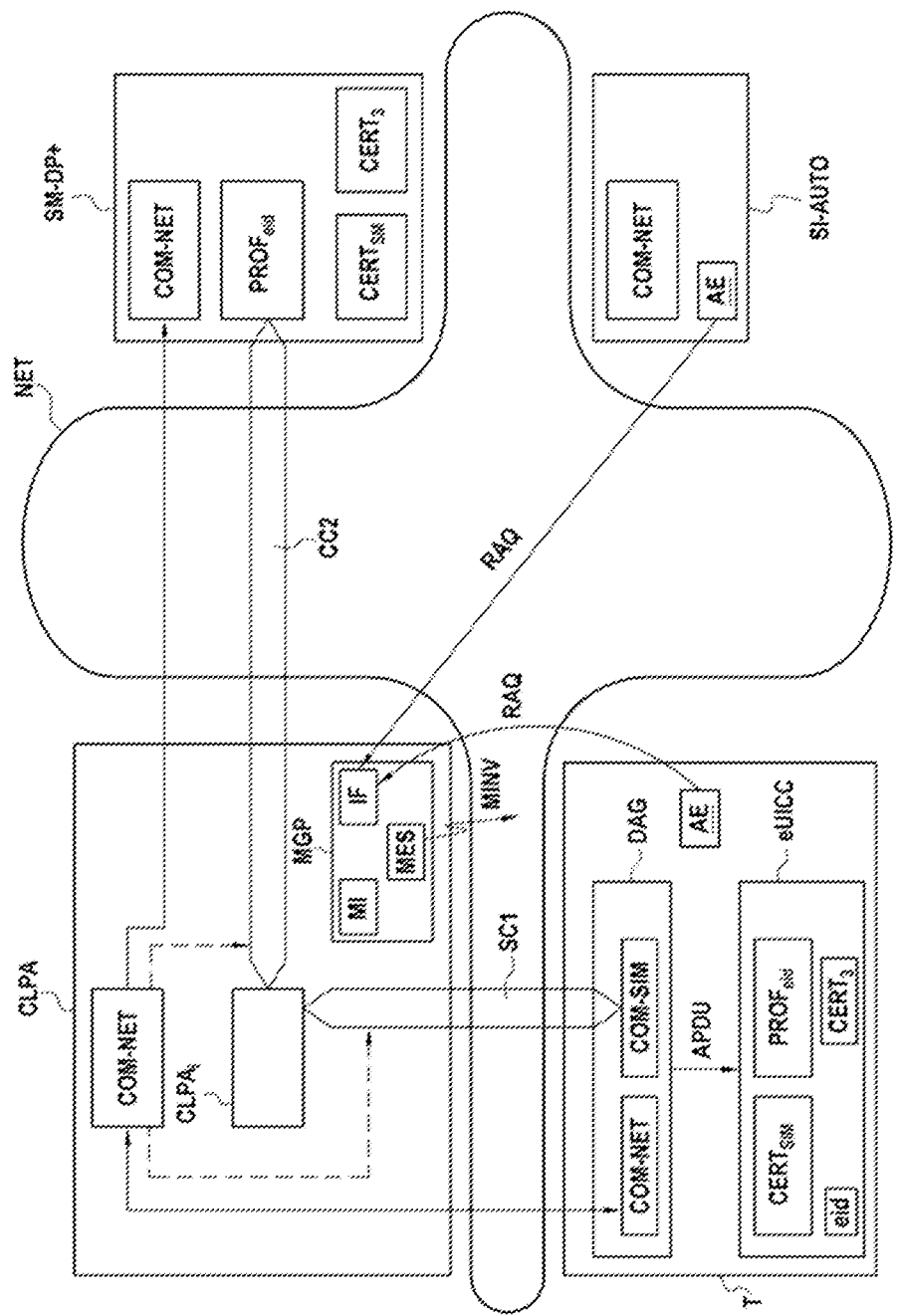
[Figure 1]

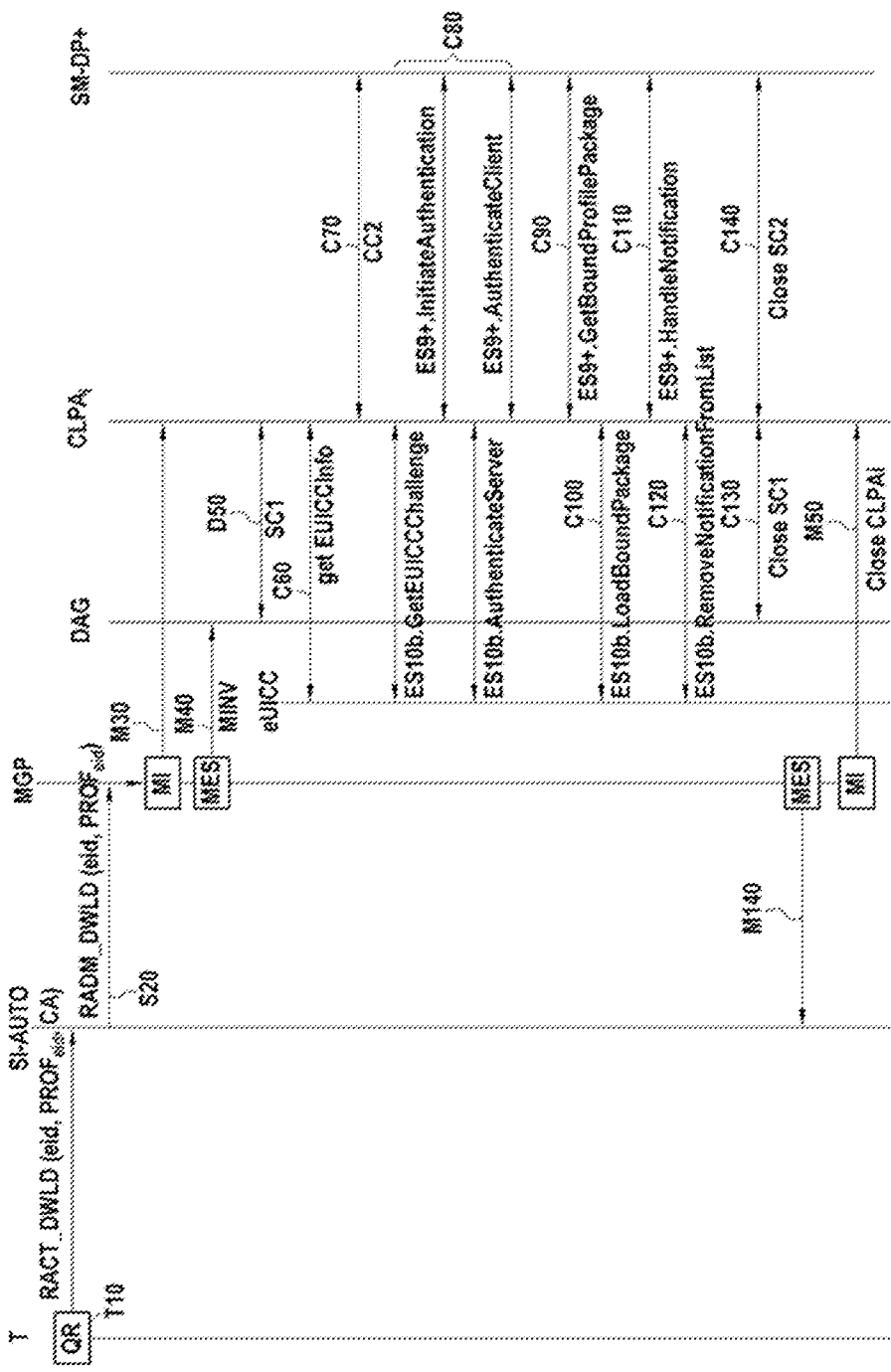
[Figure 2]

[Figure 3]
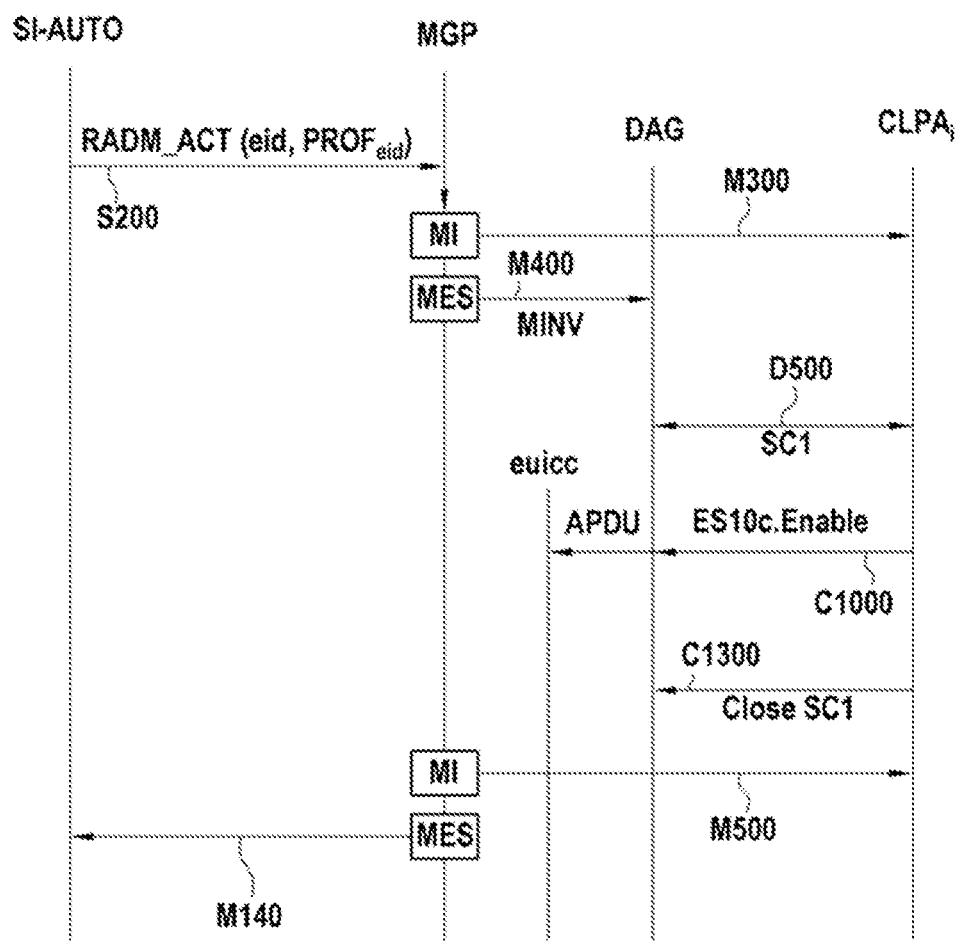

METHODS AND SYSTEMS FOR COMMUNICATION PROFILE MANAGEMENT

BACKGROUND

The present disclosure applies to the field of managing telecommunication profiles.

As is known, telecommunications profiles used by a terminal are supplied by an operator and stored in a secure element (SIM card, entity eSIM, eUICC) of this terminal.

The standard GSMA (GSM Association) defines an entity LPA (Local Profile Administration) for managing these profiles. This entity LPA embodies the interface between the secure element (eUICC for example) and the entity of the profile management operator (for example the management server for subscriptions SM-DP+ "Subscription Manager Data Preparation+").

In keeping with the provisions of the GSMA, this entity LPA is located in the operating system or in the secure element of the terminal. This dual possibility for location of the entity LPA can cause problems linked to managing, use and updating of said entity LPA, as well as problems linked to managing profiles.

This entity LPA offers an interface letting the user of the terminal manage a profile stored in a secure element of his terminal, for example for installing a new profile in the secure element or to activate or deactivate or delete such a profile.

Today it is common for example to install communication terminals in cars, to offer entertainment services for example. For manufacturers of these cars it may not be preferable to leave it to the user to manage the telecommunication profiles for accessing such services. Automobile manufacturers in particular are afraid of being asked to ensure after-sales service for problems linked to the quality of the service provided by an operator selected by the user of the car.

Communication profile management mechanisms known to date are therefore not adapted to these novel services.

SUMMARY

The present disclosure is directed to a novel communication profile management mechanism.

So according to a first aspect, the disclosure relates to a centralised communication profile management device, this device comprising:

a profile management module capable of dynamically creating an execution task to respond to a need for remote management of a communication profile in a secure element embedded in a terminal;

said profile management module being capable of executing said execution task;

a communication module capable of setting up in a network a first communications channel between this execution task and a communication profile manager;

this execution task being capable of obtaining said communication profile from the manager via the first communications channel;

this communication module being capable of setting up a communications session between this execution task and a communication agent configured to send to the secure element, at least one management command of this profile encapsulated in at least one message sent by this execution task in terms of this session; and a module configured to delete said execution task when an action responding to said need has been performed.

By way of correlation, the disclosure relates to a communication profile management process executed by a centralised communication profile management device, this process comprising a step for dynamic creation of an execution task (CLPAi) to respond to need for remote management of a communication profile in a secure element embedded in a terminal;

a step for execution of said execution task;

a step for setting up, in a network, a first communications channel between this execution task and a communication profile manager;

this execution task being capable of obtaining said communication profile from the manager via the first communications channel;

a step for setting up a communications session between this execution task and a communication agent configured to send to the secure element at least one management command of this profile encapsulated in at least one message sent by this execution task in terms of this session; and a step for deleting this execution task when an action responding to said need has been performed.

According to a second aspect, the disclosure relates to a communication agent comprising:

a first communication module configured to set up a communications session with an execution task of a centralised communication profile management device such as mentioned hereinabove; and a second communication module configured to send to a secure element embedded in a terminal at least one management command of a profile encapsulated in at least one message received from this execution task in terms of this session.

Correlatively, the disclosure relates to a communication process executed by a communication agent, this process comprising:

a step for setting up a communications session with an execution task of a centralised communication profile management device such as mentioned hereinabove;

a step for sending to a secure element embedded in a terminal at least one management command of a profile encapsulated in at least one message received from said execution task in terms of the session.

Accordingly and in general, the disclosure proposes transferring the communication profile management functions to a centralised device in the communications network, this device being capable of communicating with a communication agent configured to ensure the interface between this device and the secure element.

Viewed differently, it can be considered that the disclosure proposes relocating the functions of the LPA to the network, the communication agent playing the minimalist role of gateway between this device and the secure element.

When the terminals are embedded in an automobile, the automobile manufacturer can easily administer the communication profiles stored in the secure elements of these terminals by interfacing its information system with the centralised profile management device according to the disclosure.

According to the disclosure, an execution task is created dynamically to respond to any need for management of a profile of the secure element eUICC (administration, audit, installation, activation, deactivation, deleting of profiles) and deleted when the action responding to this need has been performed. An execution task can for example be implemented in the form of a process.

In accordance with the disclosure the communication agent according to the disclosure offers the secure element the same APIs (Application Programming Interfaces) defined by the standard GSMA; when the secure element wants to use a function of the LPA it calls the API standard, the later sending an instruction to the centralised device in the network so that the latter executes the corresponding function of LPA relocated to the network.

The communication agent can be seen as a proxy. It can be integrated or not into the terminal comprising the secure element. In a particular example of integration, the proxy (communication agent) can be integrated into the secure element, of eUICC type, for example.

Another aim of the disclosure is a terminal comprising a communication agent such as mentioned hereinabove, and a secure element.

In an embodiment, the secure element is of eSIM type such as defined by the GSMA or of eUICC type (embedded UICC).

In an embodiment, the commands are commands APDU (Application Protocol Data Unit) defined by the standard ISO 7816.

According to a particular embodiment, the execution task is configured to implement or at least participate in a mutual authentication mechanism between the profile manager and the secure element. For example, the execution task can initiate this authentication mechanism.

According to a particular embodiment of the centralised profile management device, the commands are, for example, commands for loading a profile in the secure element and/or to activate or deactivate or delete a profile in the secure element.

In a particular embodiment, the device profile management is characterised in that said execution task is configured to communicate according to a secure protocol with said profile manager by means of the first communications channel, set up by using a certificate $CERT_{SM}$ shared between the profile manager and the secure element. In this particular embodiment, the profile management commands are previously secured within the profile manager by use of this shared certificate before being sent via the secure communications channel set up between the profile manager and the execution task. According to a particular embodiment, the execution task CLPAi is also configured to transmit the profile management commands to the communication agent DAG according to a secure protocol in terms of the session SC1, this secure protocol using a certificate $CERT_{SIM}$ stored in the secure element eUICC. The fact of storing the certificate in the secure element considerably reinforces the security of the profile management process. Therefore, in this embodiment before a command profile management is transmitted to the communication agent, the centralised device decapsulates the message previously received from the profile manager and encapsulated with the certificate $CERT_{SM}$ of the profile manager and encapsulates it by using the certificate $CERT_{SIM}$ used for the communications session SC1.

In embodiments, two types of encryption may be used: a first type of encapsulation of commands corresponding to the first secure communications channel set up between the profile manager and the execution task CLPAi and a second type of encapsulation of commands corresponding to the secure protocol of the communications session SC1. Type of encapsulation means the use of a certificate (for example $CERT_{SIM}$, $CERT_{SM}$) dedicated to securing communication (messages) between a first entity and a second entity. Security is reinforced accordingly.

In another particular embodiment, each of the types of encryption uses an identical certificate.

In this embodiment, the communication agent, for example its first communication module, is configured to obtain a certificate stored in the secure element and/or to use this certificate to communicate according to the secure protocol with the centralised profile management device in terms of the session.

In an embodiment, a session between the execution task of the centralised profile management device and the communication agent associated with the secure element needs to be set up. Two variants for setting up this session are proposed according to the present disclosure.

In a first variant, which can be qualified as "push" mode the session is set up at the initiative of the centralised profile management device. When the centralised profile management device has commands to send to the secure element, it sends an invitation message to the communication agent so that the latter sets up a session with the centralised profile management device.

In this way, according to a particular embodiment of this first variant, the profile management device comprises a module for setting up a session configured to send an invitation message intended for the communication agent to invite this communication agent to set up a session with the centralised management device.

This invitation message is a message, preferably signed and/or encrypted, of SMS type for example.

In a second variant, which can be qualified as "pull" mode the communication agent has the option of interrogating, regularly for example, the centralised profile management device, by directly initiating setting up a session with the latter, without need for prior reception by the communication agent of an invitation message to initiate setting up this session. In terms of this session once it is set up, and at the initiative of the communication agent, the centralised profile management device can send commands to the secure element once such commands are available and intended for the secure element.

According to a particular mode of this second variant embodiment, the centralised profile management device comprises a module for setting up a session configured to receive interrogation requests originating from the communication agent, the module for setting up a session being configured to set up a session with the communication agent in response to such a request.

According to a particular embodiment, the centralised profile management device comprises an interface module capable of receiving an administration request by a third party, for example for:
loading the communication profile into the secure element; or
    activating, deactivating or deleting the communication profile in the secure element.

The administration request can be sent by the owner of the terminal, by the user of the terminal or by a management entity of the terminal, for example by a management entity of a bank of terminals to which this terminal belongs.

In a particular embodiment, the processes are executed by computer programs.

Consequently, another aspect of the present disclosure concerns a computer program on a recording medium, this program being likely to be run in a device or more generally in a computer. This program comprises instructions adapted to executing a profile management process such as described hereinabove.

Each of these programs can use any programming language, and be in the form of source code, object code, or intermediate code between source code and object code such as in a partially compiled form, or in any other preferred form.

Another aspect of the present disclosure concerns an information medium or a recording medium readable by a computer and comprising instructions of a computer program such as mentioned hereinabove.

The information or recording media can be any entity or device capable of storing programs. For example, the media can comprise storage means such as a ROM, for example a CD ROM or a microelectronic circuit ROM, or even for example a disk (floppy disc) or a hard drive, or flash memory.

On the other hand, the information or recording media can be transmissible media such as an electrical or optical signal which can be conveyed via an electrical or optical cable, via radio link, via wireless optical link or via other means.

The programs according to the disclosure can in particular be loaded onto a network of Internet type.

Alternatively, each information or recording medium can be an integrated circuit in which a program is incorporated, the circuit being adapted to execute or to be used in executing one of the processes according to the disclosure.

BRIEF DESCRIPTION OF THE DRAWINGS

Other characteristics and advantages of the present disclosure will emerge from the following description in reference to the appended drawings which illustrate an exemplary embodiment having no limiting character, in which:

FIG. 1 illustrates a centralised profile management device and a communication agent according to a particular embodiment in their environment;

FIG. 2 illustrates the principal steps of a profile management process and a communication process according to the present disclosure for downloading a communication profile to a secure element; and FIG. 3 illustrates the main steps of a profile management process and a communication process according to the present disclosure to activate a communication profile in a secure element.

DESCRIPTION OF EMBODIMENTS

FIG. 1 illustrates a terminal T and a centralised communication profile management device CLPA according to particular embodiments of the present disclosure in their environment.

In the embodiment described here, the terminal T is embedded in an automobile, not shown. The terminal T is in this example managed remotely by the information system SI-AUTO of the manufacturer of this automobile.

This terminal T comprises a communication agent DAG according to the present disclosure and a secure element eUICC.

The secure element eUICC comprises a unique identifier eid and a cryptographic certificate $CERT_{SIM}$. The secure element can store one or more communication profiles.

FIG. 1 also illustrates a communication profile manager SM-DP+. This profile manager SM-DP+ stores several profiles including a profile $PROF_{eid}$ intended for the secure element eUICC of the terminal T. The profile manager also ensures a respective role of securing profiles and a role for attribution of the profile to the eUICC for which it is intended.

The terminal T, the centralised profile management device CLPA, the information system SI-AUTO of the automobile manufacturer and the communication profile manager SM-DP+ communicate via a network NET. Each comprises a communication module COM-NET for this purpose.

This network NET is for example the Internet network or a cellular telephone network of 2G, 3G, 4G or 5G type.

In the embodiment described here, the centralised device CLPA profile management comprises a profile management module MGP, this module comprising:
- an interface sub-module IF capable of receiving administration requests RAQ, for example from the owner of the terminal T or from the information system SI-AUTO of the automobile manufacturer;
- a sub-module MI for managing execution tasks capable of creating, executing and deleting an execution task CLPAi to manage the communication profiles of the secure element eUICC from the network NET; and
- a sub-module MES for setting up a session, capable of setting up and cancelling a communications session SC1 between an execution task CLPAi and the communication agent DAG. In the embodiment described here, these communication sessions SC1 comply with the protocol TLS and use the certificate $CERT_{SIM}$ of the secure element eUICC.

The certificate $CERT_{SIM}$ secures exchanges of the session SC1 between the communication agent DAG and the centralised profile management device CLPA.

In the embodiment described here, the centralised profile management device CLPA is capable of setting up a communications channel CC2 between an execution task CLPAi and the profile manager SM-DP+.

In the embodiment described here, this communications channel CC2 is secure and executes the protocol TLS; it utilises a certificate $CERT_{SM}$ of the profile manager SM-DP+ to secure exchanges between the centralised device CLPA and the profile manager SM-DP+.

The protocol TLS can be replaced by another cryptographic protocol.

Certificates other than those used for securing the communications channel CC2 and the communications session SC1 can also be used to secure exchanges between the communication profile manager SM-DP+ and the secure element eUICC of the terminal T.

As will be described later, the secure communications channel CC2 can be utilised by the execution task CLPAi for downloading a communication profile PROF from the profile manager SM-DP+, for example the profile $PROF_{eid}$ intended for the secure element eUICC of the terminal T.

The messages sent by the execution task CLPAi to the communication agent DAG encapsulate profile management commands intended for the secure element eUICC. In the exemplary embodiment described here, these commands are commands APDU.

These commands can be especially:
- a command APDU for installing a profile in the secure element eUICC, for example the profile $PROF_{eid}$;
- a command APDU for activating, deactivating or deleting a profile installed in the secure element eUICC.

The communication agent DAG comprises a module COM-SIM configured to send to the secure element eUICC the profile management commands (for example commands APDU) encapsulated in the messages received from the centralised communication profile management device CLPA.

The profile management commands are initially secured within the profile manager SM-DP+, by the use of a certificate $CERT_3$ shared between the secure element eUICC and the profile manager SM-DP+, prior to being sent via the secure communications channel CC2. This ensures double encryption for heightening security of the commands.

Transmission of the profile management commands between the centralised device CLPA and the communication agent DAG is secured (encapsulation of commands in the messages) by use of the certificate $CERT_{SIM}$ of the secure element eUICC. As already mentioned hereinabove, once the commands have been initially secured within the profile manager SM-DP+, by use of a certificate $CERT_3$, in terms of the session SC1 this time, this also ensures double encryption of the commands.

The communications channel CC2 allows secure encapsulation of management commands transmitted between the profile manager SM-DP+ and the centralised device CLPA, by using the certificate $CERT_{SM}$ of the profile manager SM-DP+.

Therefore, before a profile management command is sent to the communication agent DAG, the centralised device CLPA decapsulates the previously received message originating from the profile manager SM-DP+ and encapsulated with the certificate $CERT_{SM}$ and encapsulates it by using the certificate $CERT_{SIM}$ used during the communications session SC1, ensuring securing of transmission between the centralised device CLPA and the communication agent DAG.

In the embodiment described here, an execution task CLPAi of the centralised device CLPA is configured to execute or participate in a mutual authentication mechanism between said profile manager and the secure element.

The sub-module MES for setting up a session of the centralised device CLPA is capable of setting up and cancelling a communications session SC1 between an execution task CLPAi and the communication agent DAG.

In the embodiment described here, this sub-module MES can function according to a "pull" mode and according to a "push" mode.

In the "push" mode this sub-module for setting up a session MES sends an invitation message intended for the communication agent DAG to invite this communication agent to set up a communications session SC1 with the centralised management device CLPA.

More precisely, in a particular embodiment, the information system SI-AUTO sends an administration request to the centralised profile management device CLPA. After receiving the request via the centralised device CLPA, the sub-module MES for setting up a session sends a message MINV to the communication agent DAG associated with the secure element eUICC to invite it to set up a communications session SC1 with the centralised device CLPA.

In a variant embodiment of the PUSH mode, an administration request is sent from the terminal to the information system SI-AUTO. The information system receives this request and sends it to the centralised profile management device CLPA such as described previously.

In another particular embodiment, the sub-module for setting up a session MES sends this invitation message MINV directly to the communication agent DAG, for example in the form of a signed and/or encrypted SMS verifiable by the agent DAG.

In the "pull" mode the sub-module for setting up a session MES is configured to receive interrogation requests from the communication agent DAG and to set up a session SC1 with the communication agent in response to such a request when the centralised profile management device CLPA has at least one management profile command to send to the secure element eUICC.

In the embodiment described here, the interface sub-module IF of the centralised profile management device CLPA is configured to receive administration requests RAQ, for example from the owner of the terminal T or from the information system SI-AUTO of the automobile manufacturer.

In practice this interface sub-module IF can communicate with a software application of the terminal T or of the information system SI-AUTO. This software application can be qualified as external agent AE. It presents the user with the profiles of the manager SM-DP+ which can be downloaded to any given secure element eUICC. It also offers a menu letting the user activate, deactivate or delete a profile installed in a secure element.

In reference to FIG. 2, the main steps of a profile management process and the main steps of a communication process according to a particular embodiment of the disclosure for installing a profile in a secure element will now be described.

It is assumed more precisely that a user wants to download a new profile $PROF_{eid}$ to the secure element eUICC of his terminal T; to do this he scans (step T10) a QR code supplied by the telecommunications operator.

This action triggers the sending of a request RACT_DWLD for downloading profiles to the information system SI-AUTO of the automobile manufacturer, this request comprising the identifier eid of this secure element, the identifier $PROF_{eid}$ of this profile and an activation code CA, this activation code CA letting the information system SI_AUTO verify the validity of the request.

On receipt of this request, the external agent AE of the information system SI-AUTO sends (step S20) an administration request RADM_DWLD to the profile management module MGP of the centralised profile management device CLPA. In the example described here, this request is the request downloadProfile(eid) defined in the document "GSMA SGP.22 RSP Technical Specification Version 2.2", hereafter [1].

The sub-module MI for managing execution tasks creates (step M30) an execution task CLPAi for downloading the profile $PROF_{eid}$ from the manager SM-DP+ to the secure element eUICC.

The sub-module MES for setting up a session sends (step M40) an SMS signed and/or encrypted MINV to the communication agent DAG associated with the secure element eUICC to invite it to set up a communications session SC1 with the execution task CLPAi.

A secure communications session TLS SC1 is set up (step D50) between the communication agent DAG and the execution task CLPAi, this session using the certificate $CERT_{SIM}$ of the secure element eUICC.

During a step C60, the execution task CLPAi interrogates the secure element eUICC to obtain the information to be provided to the profile manager SM-DP+. In the embodiment described here, the execution task CLPAi utilises the function GetEUICCInfo of [1].

During a step C70, the execution task CLPAi creates a communications channel TLS CC2 with the profile manager SM-DP+by using the certificate $CERT_{SM}$ of this manager.

During a step C80, the execution task CLPAi carries out a mutual authentication mechanism between the security element eUICC and the profile manager SM-DP+. In the embodiment described here, this step uses the functions ES10b.GetEUICCChallenge, ES9+.InitiateAuthentication, ES10b.AuthenticateServer and ES9+.AutenticateClient of [1].

In a particular embodiment, not shown here, the function ES10b.GetEUICCChallenge is performed between the step C60 and the step C70 and not during the step C80.

The execution task CLPAi downloads (step C90) the profile from the profile manager SP-DP+ via the communications channel TLS CC2. In the embodiment described here, for this it uses the function ES9+.GetBoundProfilePackage of [1].

The execution task CLPAi sends (step C100) messages secured by the certificate $CERT_{SIM}$ to the communication agent DAG via the session TLS SC1, these messages encapsulating commands APDU for installing the profile in the secure element eUICC. These commands APDU are transmitted via the module COM-SIM to the secure element eUICC. In the embodiment described here, the execution task CLPAi utilises the function LoadBoundProfilePackage of [1] to transfer the profile to the secure element eUICC.

If downloading is done correctly, the execution task CLPAi sends a message of successful installation ES9+.HandleNotification to the profile manager SM-DP+ (step C110) and a notification message ES10BRemoveNotificationfromList to the secure element eUICC (step C120).

During a step C130, the execution task CLPAi terminates the communications session SC1.

During a step C140, the execution task terminates the communications channel CC2 with the communication profile manager SM-DP+.

During a step M140, the sub-module MES of the profile management module sends the external agent AE of the information system SI-AUTO information according to which the requested profile has been downloaded in the secure element eUICC.

The sub-module MI for managing execution tasks terminates/deletes (step M50) the execution task CLPAi.

FIG. 3 illustrates the main steps of a profile management process and the main steps of a communication process according to a particular embodiment of the disclosure to activate a profile in a secure element.

It is assumed more precisely that the automobile manufacturer wants to activate the profile $PROF_{eid}$ in the secure element eUICC of the terminal T.

For this he uses the external agent AE of the information system SI-AUTO to send (step S200) an administration request RADM_ACT for profile activation (eid, $PROF_{eid}$) to the profile management module MGP (more precisely to the interface sub-module IF) of the centralised profile management device CLPA. In the example described here, this request is the request enableProfile(eid) of [1].

The sub-module MI for managing execution tasks creates (step M300) an execution task CLPAi to activate the profile $PROF_{eid}$ in the secure element eUICC.

The sub-module MES for setting up a session sends (step M400) an SMS signed MINV to the communication agent DAG associated with the secure element eUICC to invite it to set up a communications session SC1 with the execution task CLPAi.

A secure communications session TLS SC1 is set up (step D500) between the communication agent DAG and the execution task CLPAi, this session using the certificate $CERT_{SIM}$ of the secure element eUICC.

The execution task CLPAi sends (step C1000) to the communication agent DAG, via the session TLS SC1, messages secured by the certificate $CERT_{SIM}$, these messages encapsulating commands APDU to activate the profile in the secure element eUICC. These commands APDU are transmitted via the module COM-SIM to the secure element eUICC. In the embodiment described here, the execution task CLPAi utilises the function ES10cEnable of [1] to activate the profile $PROF_{eid}$ in the secure element eUICC.

If activation is done correctly, the execution task CLPAi terminates the communications session SC1 (step C1300).

The sub-module MI for managing execution tasks terminates/deletes (step M500) the execution task CLPAi.

During a step M140, the sub-module MES of the profile management module sends to the external agent AE of the information system SI-AUTO information according to which the profile $PROF_{eid}$ has been activated in the secure element eUICC.

The invention claimed is:

1. A system comprising:
    a profile management device comprising first code instructions and a first processor, and
    a communication agent included within the terminal, the terminal being remote from the profile management device, the communication agent comprising second code instructions and a processor;
    wherein the first processor is configured, upon execution of the first instructions, to:
    determine a need for remote management of a communication profile in a secure element embedded in the terminal being remote from the profile management device;
    set up, in a network, a first communications channel between said execution task and a communication profile manager included within the terminal;
    obtain via said execution task said communication profile from said communication profile manager via said first communications channel set up with said communication profile manager;
    set up, in a network, a communications session between said execution task and the communication agent;
    send at least one message by said execution task in terms of said communication session to said communication agent, the at least one message encapsulating at least one management command of said profile for sending by the communication agent to said secure element; and
    determine that an action responding to said need is performed and delete said execution task;
    wherein the second processor is configurd, upon execution of the second code instructions, to send to the secure element said at least one management command.

2. The system according to claim 1, wherein said execution task is configured to implement or participate in a mutual authentication mechanism between said profile manager and said secure element.

3. The system according to claim 1, wherein said management command includes a command for loading said profile in said secure element, to activate, deactivate, or delete said profile in said secure element.

4. The system according to claim 1, wherein said execution task is configured to communicate according to a secure protocol with said communication agent in terms of said communication session, said secure protocol using a certificate stored in said secure element.

5. The system according to claim 1, wherein said execution task is configured to communicate according to a secure protocol with said profile manager in the first communication channel, said secure protocol using a certificate stored in said profile manager.

6. The system according to claim 1, wherein the processor is further configured, upon execution of instructions, to set up a session to send an invitation message to said communication agent to invite said communication agent to set up said communication session with the profile management device.

7. The system according to claim 6, wherein the invitation message is a signed and/or encrypted message of SMS type.

8. The system according to claim 1, wherein the first processor is further configured, upon execution of the first code instructions, to set up a session to receive interrogation requests originating from said communication agent and to set up said communication session with said communication agent in response to an interrogation request.

9. The system according to claim 1, wherein the processor is further configured, upon execution of the first code instructions, to implement an interface for receiving an administration request from a third party for:

loading said communication profile into said secure element; or activating, deactivating or deleting said communication profile in said secure element.

10. A method performed by a system comprising a profile management device and a communication agent included within a terminal, the method comprising:

dynamically creating and executing an execution task at the profile management device to respond to a need for remote management of a communication profile in a secure element embedded in a terminal remote from the profile management device;

setting up, in a network, a first communication channel between said execution task and a communication profile manager;

obtaining via said execution task said communication profile from said communication profile manager via said first communication channel;

setting up, in a network, a communications session between said execution task and the communication agent;

sending at least one message by said execution task in terms of said communication session to said communication agent, the at least one message encapsulating at least one management command of said profile;

sending from the communication agent to the secure element said at least one management command; and deleting said execution task when an action responding to said need has been performed.

* * * * *